United States Patent
Sato et al.

(10) Patent No.: US 8,945,784 B2
(45) Date of Patent: Feb. 3, 2015

(54) HYDROGEN PRODUCTION APPARATUS AND FUEL CELL SYSTEM USING THE SAME

(75) Inventors: Yasushi Sato, Kanagawa (JP); Emi Kato, Kanagawa (JP); Takaya Matsumoto, Kanagawa (JP); Masataka Kadowaki, Kanagawa (JP); Ryuji Yukawa, Osaka (JP); Takuya Kajita, Kanagawa (JP)

(73) Assignee: JX Nippon Oil & Energy Corporation (JP)

( * ) Notice: Subject to any disclaimer, the term of this patent is extended or adjusted under 35 U.S.C. 154(b) by 507 days.

(21) Appl. No.: 12/935,823

(22) PCT Filed: Mar. 9, 2009

(86) PCT No.: PCT/JP2009/054380
§ 371 (c)(1), (2), (4) Date: Sep. 30, 2010

(87) PCT Pub. No.: WO2009/122861
PCT Pub. Date: Oct. 8, 2009

(65) Prior Publication Data
US 2011/0027674 A1  Feb. 3, 2011

(30) Foreign Application Priority Data

Mar. 31, 2008 (JP) ................................ 2008-090813

(51) Int. Cl.
*H01M 8/06* (2006.01)
*H01M 8/04* (2006.01)
(Continued)

(52) U.S. Cl.
CPC . *C01B 3/583* (2013.01); *C01B 3/38* (2013.01); *C01B 3/48* (2013.01); *H01M 8/0612* (2013.01);
(Continued)

(58) Field of Classification Search
CPC ........................... H01M 8/0612; H01M 8/0668
USPC .................. 429/412, 410, 408, 436, 435, 434
See application file for complete search history.

(56) References Cited

U.S. PATENT DOCUMENTS 6,986,797 B1 * 1/2006 Clawson et al. ............ 48/102 A
2006/0233690 A1 10/2006 Taguchi et al.

FOREIGN PATENT DOCUMENTS

CN 1243096 A 2/2000
EP 0976679 A1 2/2000
(Continued)

OTHER PUBLICATIONS

International Search Report for International Application No. PCT/JP2009/054380 mailed Jun. 9, 2009 with English translation.

*Primary Examiner* — Helen O Conley
(74) *Attorney, Agent, or Firm* — Cantor Colburn LLP (57) ABSTRACT

There are provided a hydrogen production apparatus and a hydrogen producing method that can easily bring the temperature of a gas to be supplied to a preferential oxidation catalyst bed to a proper range without the necessity of flow rate control of a cooling medium, and a fuel cell system which is relatively inexpensive and can easily realize stable operation. The hydrogen producing method includes a reforming step of obtaining a hydrogen-containing gas from a raw material for hydrogen production by utilizing a reforming reaction, a shift reaction step of reducing the concentration of carbon monoxide in the gas obtained from the reforming step by a shift reaction, a cooling step of cooling the gas obtained from the shift reaction step, a heating step of heating the gas cooled in the cooling step and a preferential oxidation reaction step of reducing the concentration of carbon monoxide in the gas heated in the heating step, wherein in the heating step, the gas cooled in the cooling step is heated by heat exchange with the use of heat generated by the preferential oxidation reaction. A hydrogen production apparatus suitable for implementing this method. A fuel cell system provided with the hydrogen production apparatus.

18 Claims, 7 Drawing Sheets

(51) Int. Cl.
*C01B 3/58* (2006.01)
*C01B 3/38* (2006.01)
*C01B 3/48* (2006.01)

(52) U.S. Cl.
CPC ..... *H01M 8/0668* (2013.01); *C01B 2203/0233* (2013.01); *C01B 2203/0283* (2013.01); *C01B 2203/044* (2013.01); *C01B 2203/047* (2013.01); *C01B 2203/066* (2013.01); *C01B 2203/1047* (2013.01); *C01B 2203/1052* (2013.01); *C01B 2203/1058* (2013.01); *C01B 2203/107* (2013.01); *C01B 2203/1247* (2013.01); *C01B 2203/127* (2013.01); *Y02E 60/50* (2013.01)
USPC .......... 429/412; 429/410; 429/408; 429/436; 429/435; 429/434

(56) References Cited

FOREIGN PATENT DOCUMENTS

| | | | |
|---|---|---|---|
| JP | 1-123627 | A | 5/1989 |
| JP | 1-123628 | A | 5/1989 |
| JP | 11-260387 | A | 9/1999 |
| JP | 2000-44204 | A | 2/2000 |
| JP | 2001-176527 | A | 6/2001 |
| JP | 2002-284505 | A | 10/2002 |
| JP | 2003-12302 | A | 1/2003 |
| JP | 2003-17109 | A | 1/2003 |
| JP | 2003-123820 | A | 4/2003 |
| JP | 2004-296266 | A | 10/2004 |

* cited by examiner

Cooled gas

Gas after preferential oxidation reaction

HYDROGEN PRODUCTION APPARATUS AND FUEL CELL SYSTEM USING THE SAME

This is a U.S. national stage application of International Application No. PCT/JP2009/054380, filed on 9 Mar. 2009. Priority under 35 U.S.C. §119(a) and 35 U.S.C. §365(b) is claimed from Japanese Application No. JP2008-090813, filed Mar. 31, 2008, the disclosure of which is also incorporated herein by reference.

TECHNICAL FIELD

The present invention relates to a hydrogen production apparatus for producing hydrogen from a raw material for hydrogen production such as city gas, liquefied petroleum gas (LPG), kerosene and the like, and a fuel cell system which uses a hydrogen-containing gas produced by this hydrogen production apparatus as fuel.

BACKGROUND ART

The development of fuel cells is intensifying, since it is said that fuel cells are a power generation system having good energy utilization efficiency. Among fuel cells, polymer electrolyte fuel cells are especially drawing attention due to their high power density and ease of handling.

For a fuel cell, which generates power through an electrochemical reaction between hydrogen and oxygen, it is essential to establish hydrogen supply means. One method for doing this is to produce hydrogen by reforming a raw material for hydrogen production such as a hydrocarbon fuel. From the viewpoint that supply systems of hydrocarbon fuels are already socially established, this method is more advantageous than methods in which pure hydrogen is used.

Examples of hydrocarbon fuels include city gas, LPG, gasoline, kerosene, gas oil and the like. In order to use these raw materials for hydrogen production in fuel cells, hydrogen must be produced from the hydrocarbon. For this purpose, a hydrogen production apparatus equipped with at least a reformer is used.

In a hydrogen production apparatus, for example, a hydrocarbon is reacted with water in a reformer to decompose into mainly carbon monoxide and hydrogen. Then, a large portion of the carbon monoxide is reacted with water in a shift reactor to convert into hydrogen and carbon dioxide. Finally, the remaining small amount of carbon monoxide is reacted with oxygen in a preferential oxidation reactor to turn into carbon dioxide. Further, since sulfur may be a poisoning substance for reforming catalyst or the like, in many cases a desulfurizer is provided for removing the sulfur contained in the hydrocarbon fuel.

In such a hydrogen production apparatus, it is a known practice to cool an outlet gas of the shift reaction part using water or air (ambient air) in order to bring the temperature of the preferential oxidation reaction part to a proper temperature or in order to remove the water content in the gas to be supplied to the preferential oxidation reaction part (Patent Documents 1 to 4).

Patent Document 1: JP2002-284505A
Patent Document 2: JP2003-12302A
Patent Document 3: JP2003-17109A
Patent Document 4: JP2004-296266A

DISCLOSURE OF THE INVENTION

Problems to be Solved by the Invention

When cooling the outlet gas of the shift reactor, the temperature of water or air used as a cooling medium may be affected by fluctuation in the temperature of the ambient air, and thus management of the cooling temperature is not always easy. Especially when water is used as the cooling medium, the temperature of the cooled gas may become very low, falling below a preferable temperature of the cooled gas to be supplied to the preferential oxidation reactor, which might impair stability of operation. In order to manage the cooling temperature, it is possible to perform, for example, flow rate control of the cooling medium, but the flow rate control may result in a cost increase.

It is an object of the present invention to provide a hydrogen production apparatus and a hydrogen producing method that can easily bring the temperature of a gas to be supplied to a preferential oxidation catalyst bed to a proper range without the necessity of flow rate control of a cooling medium.

It is another object of the present invention to provide a fuel cell system provided with such a hydrogen production apparatus, which is relatively inexpensive and can easily realize stable operation.

Means for Solving the Problems

The present invention provides the following hydrogen production apparatus, hydrogen producing method and fuel cell system.

(1) A hydrogen production apparatus including:
  a reformer for obtaining a hydrogen-containing gas from a raw material for hydrogen production by utilizing a reforming reaction;
  a shift reactor for reducing the concentration of carbon monoxide in the gas obtained from the reformer by a shift reaction;
  a cooler for cooling the gas obtained from the shift reactor;
  a heating means for heating the gas cooled by the cooler; and
  a preferential oxidation reactor including a preferential oxidation catalyst bed packed with a catalyst capable of promoting a preferential oxidation reaction which preferentially oxidizes carbon monoxide, for reducing the concentration of carbon monoxide in the gas heated by the heating means, wherein
  the heating means includes a heat exchange structure in which the gas cooled by the cooler is heated with the use of heat generated by the preferential oxidation reaction.

(2) The hydrogen production apparatus according to (1), wherein the heat exchange structure is a structure that allows heat exchange between the gas cooled by the cooler and at least one of a gas discharged from the preferential oxidation catalyst bed and the preferential oxidation catalyst bed.

(3) The hydrogen production apparatus according to (2), including a structure in which the preferential oxidation reactor is integrated with the heating means.

(4) The hydrogen production apparatus according to (3), wherein
  the structure in which the preferential oxidation reactor is integrated with the heating means includes a double tube structure, and
  the preferential oxidation catalyst bed is housed in the interior of an inner tube of the double tube structure, and an annular section of the double tube structure is made to be a channel for the gas cooled by the cooler.

(5) The hydrogen production apparatus according to (3), wherein
  the structure in which the preferential oxidation reactor is integrated with the heating means includes a double tube structure, the interior of the inner tube of the double tube structure is made to be a channel for the gas cooled by the cooler, and the preferential oxidation catalyst bed is housed in a region of a part of the annular section of the double tube structure, and a region of another part of the annular section located downstream of the former region in a flow direction of the gas that flows through the annular section is made to be a channel for the gas discharged from the preferential oxidation catalyst bed.

(6) The hydrogen production apparatus according to any one of (1) to (5), including a condensed water separation means for separating condensed water generated through cooling by the cooler from the gas obtained from the shift reactor.

(7) The hydrogen production apparatus according to any one of (1) to (6), wherein the cooler is a water-cooling type cooler.

(8) The hydrogen production apparatus according to (7), wherein the cooling medium in the cooler is process water for reforming.

(9) A hydrogen producing method, including:

a reforming step of obtaining a hydrogen-containing gas from a raw material for hydrogen production by utilizing a reforming reaction;

a shift reaction step of reducing the concentration of carbon monoxide in the gas obtained from the reforming step by a shift reaction;

a cooling step of cooling the gas obtained from the shift reaction step;

a heating step of heating the gas cooled in the cooling step; and a preferential oxidation reaction step of reducing the concentration of carbon monoxide in the gas heated in the heating step using a preferential oxidation catalyst bed packed with a catalyst capable of promoting a preferential oxidation reaction which preferentially oxidizes carbon monoxide, wherein in the heating step, the gas cooled in the cooling step is heated by heat exchange with the use of heat generated by the preferential oxidation reaction.

(10) The hydrogen producing method according to (9), wherein in the cooling step, the gas obtained from the shift reaction step is cooled to 0° C. or above and 120° C. or below.

(11) The hydrogen producing method according to (9) or (10), wherein the temperature of the preferential oxidation catalyst bed is set to 80° C. or above and 250° C. or below.

(12) A fuel cell system including:

a hydrogen production apparatus including:

a reformer for obtaining a hydrogen-containing gas from a raw material for hydrogen production by utilizing a reforming reaction, a shift reactor for reducing the concentration of carbon monoxide in the gas obtained from the reformer by a shift reaction, a cooler for cooling the gas obtained from the shift reactor, a heating means for heating the gas cooled by the cooler, and a preferential oxidation reactor including a preferential oxidation catalyst bed packed with a catalyst capable of promoting a preferential oxidation reaction which preferentially oxidizes carbon monoxide, for reducing the concentration of carbon monoxide in the gas heated by the heating means, wherein the heating means includes a heat exchange structure in which the gas cooled by the cooler is heated with the use of heat generated by the preferential oxidation reaction; and a fuel cell for generating electric power using hydrogen obtained from the hydrogen production apparatus as fuel.

(13) The fuel cell system according to (12), wherein the cooler is a water-cooling type cooler and the cooling medium in the cooler is process water for reforming.

(14) The fuel cell system according to (12), further including a hot-water storage tank, wherein the cooler is a water-cooling type cooler, and the cooling medium in the cooler is heat-recovery water for the hot-water storage tank.

(15) The fuel cell system according to (12), further including a hot-water storage tank, wherein the cooler is a water-cooling type cooler, and the cooling medium in the cooler is process water for reforming and heat-recovery water for the hot-water storage tank.

Advantages of the Invention

According to the present invention, there are provided a hydrogen production apparatus and a hydrogen producing method that can easily bring the temperature of a gas to be supplied to a preferential oxidation catalyst bed to a proper range without the necessity of flow rate control of a cooling medium.

According to the present invention, there is provided a fuel cell system provided with such a hydrogen production apparatus, which is relatively inexpensive and can easily realize stable operation.

DESCRIPTION OF SYMBOLS

1 Desulfurizer
2 Reformer
3 Shift reactor
4 Cooler
5 Heating means
6 Preferential oxidation reactor
10 Hydrogen production apparatus
20 Fuel cell
201 Preferential oxidation catalyst bed
202 Inner tube 203 Annular section
204 Outer tube
301 Inner space of inner tube
302 Inner tube
303 Region of a part of annular section (preferential oxidation catalyst bed)
304 Outer tube
305 Region of another part of annular section
401 Preferential oxidation catalyst bed
402 Distribution plate
403 Cylindrical vessel
501 Desulfurizer
502 Reformer
503 Shift reactor
504 Cooler (heat exchanger a)
505 Cooler (heat exchanger b)
506 Drain pot
507 Preferential oxidation reactor integrated with heating means
508 Heat exchanger c
509 Pure water tank
510 Heat exchanger d
511 Fuel cell (cell stack)
512 Hot-water storage tank
513, 514 Flow rate control valve Best Mode For Carrying Out The Invention Hereinafter, embodiments of the present invention will be described with reference to the accompanying drawings but the present invention will by no means be limited to these embodiments.

The term "dry mole %" used in the present specification refers to mole % calculated excluding the water content and "dry mole ppm" refers to mole ppm calculated excluding the water content.

Figure 1:
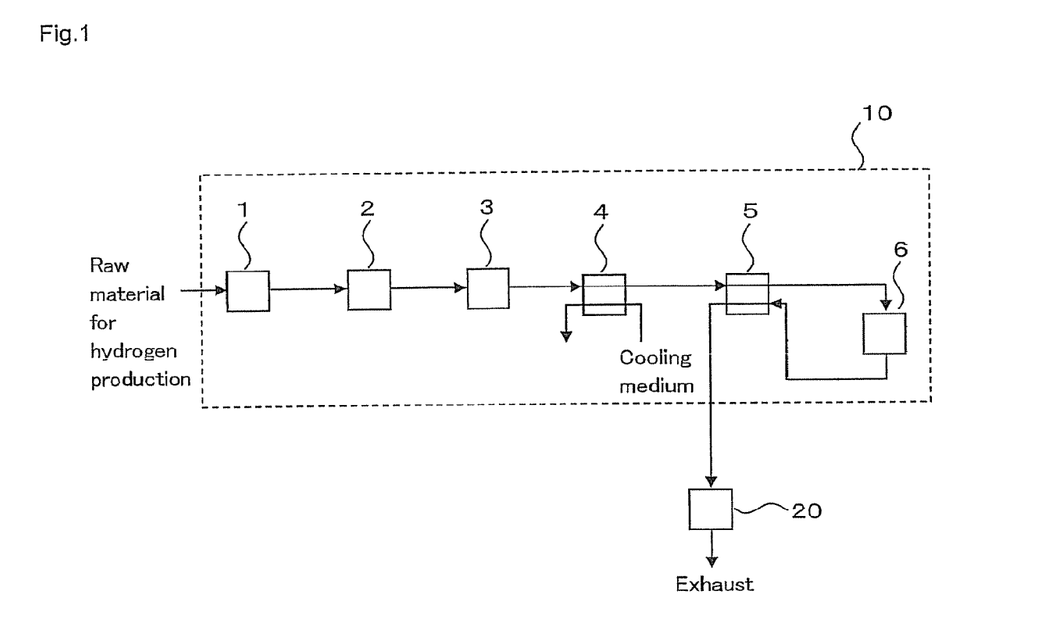
FIG. 1 is a flow diagram illustrating the outline of an embodiment of a fuel cell system according to the present invention.

FIG. 1 schematically illustrates an embodiment of a fuel cell system of the present invention. The fuel cell system is provided with a hydrogen production apparatus 10 and a fuel cell 20 that generates electric power using hydrogen obtained from the hydrogen production apparatus as fuel.

The hydrogen production apparatus 10 has a reformer 2 for obtaining a hydrogen-containing gas from a raw material for hydrogen production by utilizing a reforming reaction. Here, a desulfurizer 1 is provided to reduce the sulfur content in the raw material for hydrogen production supplied to the reformer.

Furthermore, the hydrogen production apparatus includes a shift reactor 3 for reducing the concentration of carbon monoxide in the gas obtained from the reformer by a shift reaction ($CO+H_2O \rightarrow CO_2+H_2$).

The hydrogen production apparatus includes a cooler 4 for cooling the gas obtained from the shift reactor.

The hydrogen production apparatus includes heating means 5 for heating the gas cooled by the cooler. Here, the gas cooled by the cooler may contain liquid such as condensed water. Alternatively, the gas cooled by the cooler may also be a gas after removing the liquid such as condensed water.

The hydrogen production apparatus includes a preferential oxidation reactor 6 for reducing the concentration of carbon monoxide in the gas heated by the heating means. The preferential oxidation reactor includes a preferential oxidation catalyst bed packed with a catalyst capable of promoting a preferential oxidation reaction which preferentially oxidizes carbon monoxide. The preferential oxidation reaction is a reaction which preferentially oxidizes carbon monoxide ($2CO+O_2 \rightarrow 2CO_2$) and is accompanied by heat generation.

The heating means 5 has a heat exchange structure for heating the gas cooled by the cooler 4 using heat generated by the preferential oxidation reaction.

The heat exchange structure may have a structure in which heat exchange is performed between the gas cooled by the cooler and at least one of the gas discharged from the preferential oxidation catalyst bed and the preferential oxidation catalyst bed.

In the embodiment shown in FIG. 1, the heating means 5 is a heat exchanger provided independently of the preferential oxidation reactor 6. In this heat exchanger, the gas cooled by the cooler is heated by heat exchange with the gas which has undergone the preferential oxidation reaction and is discharged from the preferential oxidation reactor 6. That is, the heat exchange structure of the heating means 5 is a structure in which heat exchange is performed between the gas discharged from the preferential oxidation catalyst bed and the gas cooled by the cooler.

The gas after preferential oxidation reaction discharged from the heating means is supplied to the fuel cell 20, more particularly to the anode thereof as anode gas. An oxygen-containing gas such as air is preheated or humidified as required and supplied to the cathode of the fuel cell as cathode gas (not shown). In the fuel cell, hydrogen in the anode gas is electrochemically reacted with oxygen in the cathode gas and electric power is generated. The gas discharged from the anode is subjected to processing, such as combustion processing of combustible components and heat recovery, as appropriate and then exhausted out of the system. The gas discharged from the cathode is also subjected to processing, such as heat recovery, as required and then exhausted out of the system.

It is possible to adopt a structure in which the heating means is integrated with the preferential oxidation reactor.

Figure 2:
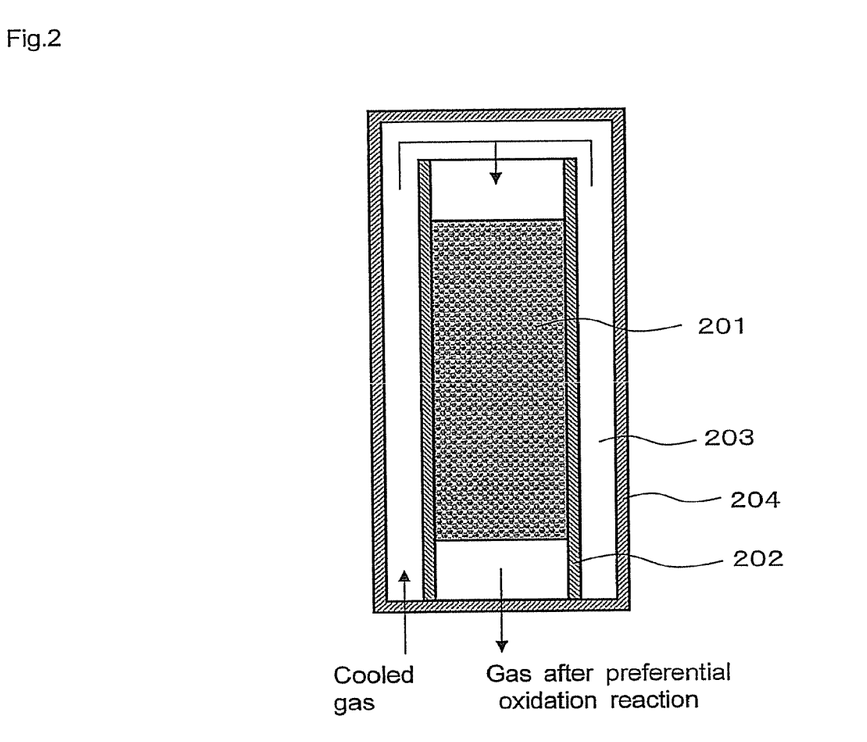
FIG. 2 is a schematic cross-sectional view of an embodiment of a preferential oxidation reactor that can be used in the present invention.

For example, as shown in FIG. 2, it is possible to adopt a structure in which the preferential oxidation reactor integrated with the heating means has a double tube structure, a preferential oxidation catalyst bed 201 is housed in the interior of an inner tube 202 of the double tube structure and an annular section 203 (a space between the inner tube 202 and an outer tube 204) is used as a channel for the gas cooled by the cooler. The annular section is made to be empty space, and thereby the annular section can be used as a channel for the gas cooled by the cooler. In this preferential oxidation reactor, the preferential oxidation catalyst bed is housed in the innermost part of the cylindrical double tube reaction vessel, the gas cooled by the cooler passes outside the preferential oxidation catalyst bed and is then introduced into the preferential oxidation catalyst bed. The preferential oxidation catalyst bed generates heat through an oxidation reaction. When flowing through the annular section 203, the gas cooled by the cooler is heated by heat exchange with the preferential oxidation catalyst bed and heat exchange with the gas which has undergone the preferential oxidation reaction. The gas heated in this way is introduced into the preferential oxidation catalyst bed.

Figure 3:
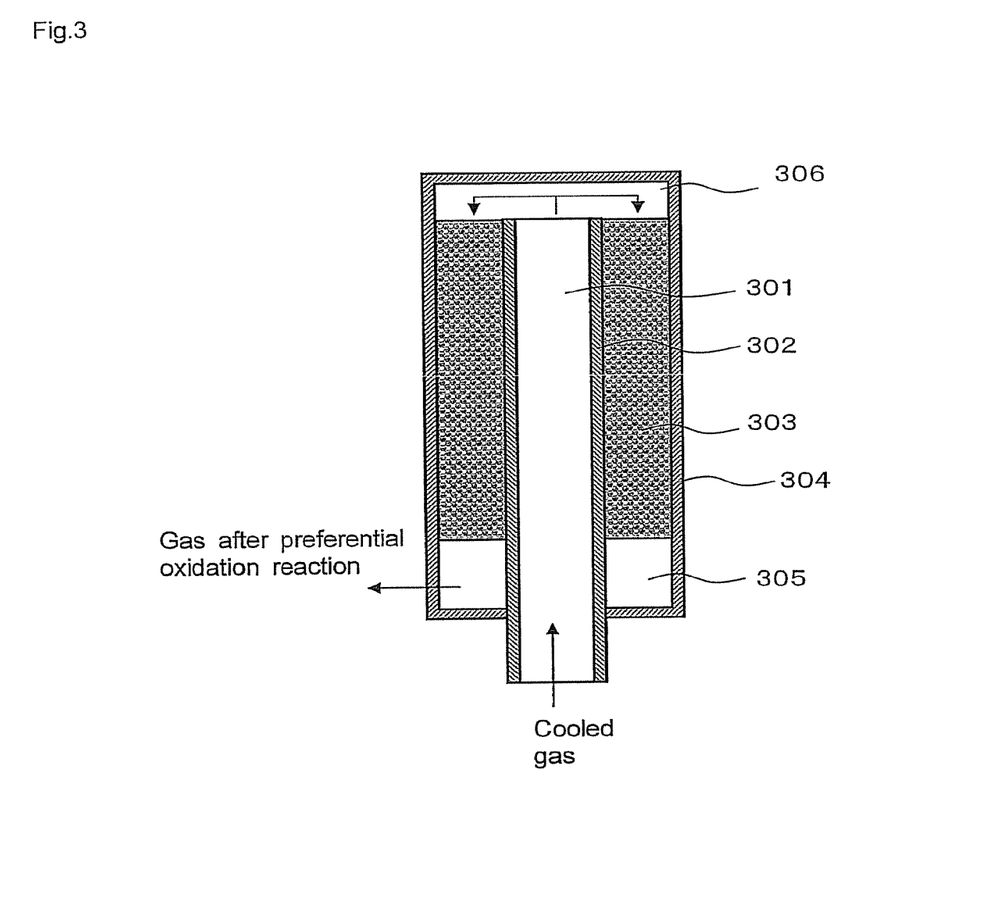
FIG. 3 is a schematic cross-sectional view of another embodiment of the preferential oxidation reactor that can be used in the present invention.

Alternatively, a structure as shown in FIG. 3 may be adopted. In the embodiment shown in FIG. 3, the preferential oxidation reactor integrated with the heating means has a double tube structure and an inner space 301 of an inner tube 302 of the double tube structure is used as a channel for the gas cooled by the cooler. The interior of the inner tube is made to be empty space, and thereby the interior of the inner tube can be used as a channel for the gas cooled by the cooler. A preferential oxidation catalyst bed is housed in a region 303 of a part of the annular section (a space between the inner tube 302 and an outer tube 304). Region 305 of another part of the annular section located downstream of the former region in the flow direction of the gas that flows through the annular section is used as a channel for the gas discharged from the preferential oxidation catalyst bed. The region 305 is made to be empty space, and thereby the region 305 can be used as a channel for the gas discharged from the preferential oxidation catalyst bed. In other words, this preferential oxidation reactor has a cylindrical reactor vessel (outer tube) and the gas cooled by the cooler is introduced into a tube (inner tube) that passes through the center of the preferential oxidation catalyst bed. When flowing through the inner tube 302, the gas cooled by the cooler is heated by heat exchange with the gas which has undergone the preferential oxidation reaction and heat exchange with the preferential oxidation catalyst bed. The gas heated in this way is introduced into the preferential oxidation catalyst bed.

The heating means may be singular or plural. For example, a plurality of heat exchangers which are provided independently of the preferential oxidation reactor may be used. It is possible to use, in addition to adopting a structure in which the preferential oxidation reactor is integrated with the heating means, a heat exchanger which is provided independently of the preferential oxidation reactor.

According to the present invention, the gas cooled by the cooler is heated by heat exchange with the use of heat generated by a preferential oxidation reaction. Thus, it is possible to increase the temperature of the preferential oxidation catalyst bed inlet gas and easily bring the temperature of preferential oxidation reactor inlet gas to a preferable range without carrying out flow rate control of the cooling medium. In this case, there is no need to provide heating means which uses an additional energy source, such as an electric heater, and this structure is also economic in this sense. In addition, the temperature of the gas discharged from the preferential oxidation catalyst bed can be reduced by the above-described heat exchange. This is advantageous in that, when there exists a device whose heat resistant temperature is relatively low, such as a valve, downstream of the preferential oxidation reactor, the temperature of the gas which flows into the device can be reduced.

[Separation of Condensed Water]

Condensed water may be generated during cooling by the cooler. Therefore, the hydrogen production apparatus or fuel cell system may have a structure of separating this condensed water.

As condensed water separation means for separating condensed water, a publicly known structure capable of separating condensed water from the gas obtained from the shift reactor may be adopted as appropriate. As the condensed water separation means, for example, an auto drain provided downstream of the cooler may be adopted. Alternatively, a gas-liquid separation structure may be annexed to the cooler.

[Cooler]

As a cooler, a publicly known cooler capable of cooling a gas may be adopted as appropriate.

As the cooler, a water-cooling type cooler which uses water as a cooling medium may be used. In this case, process water used for reforming may be used as the cooling medium. In the case of a fuel cell system provided with a hot-water storage tank, heat-recovery water used for the hot-water storage tank may be used as the cooling medium.

Figure 5:
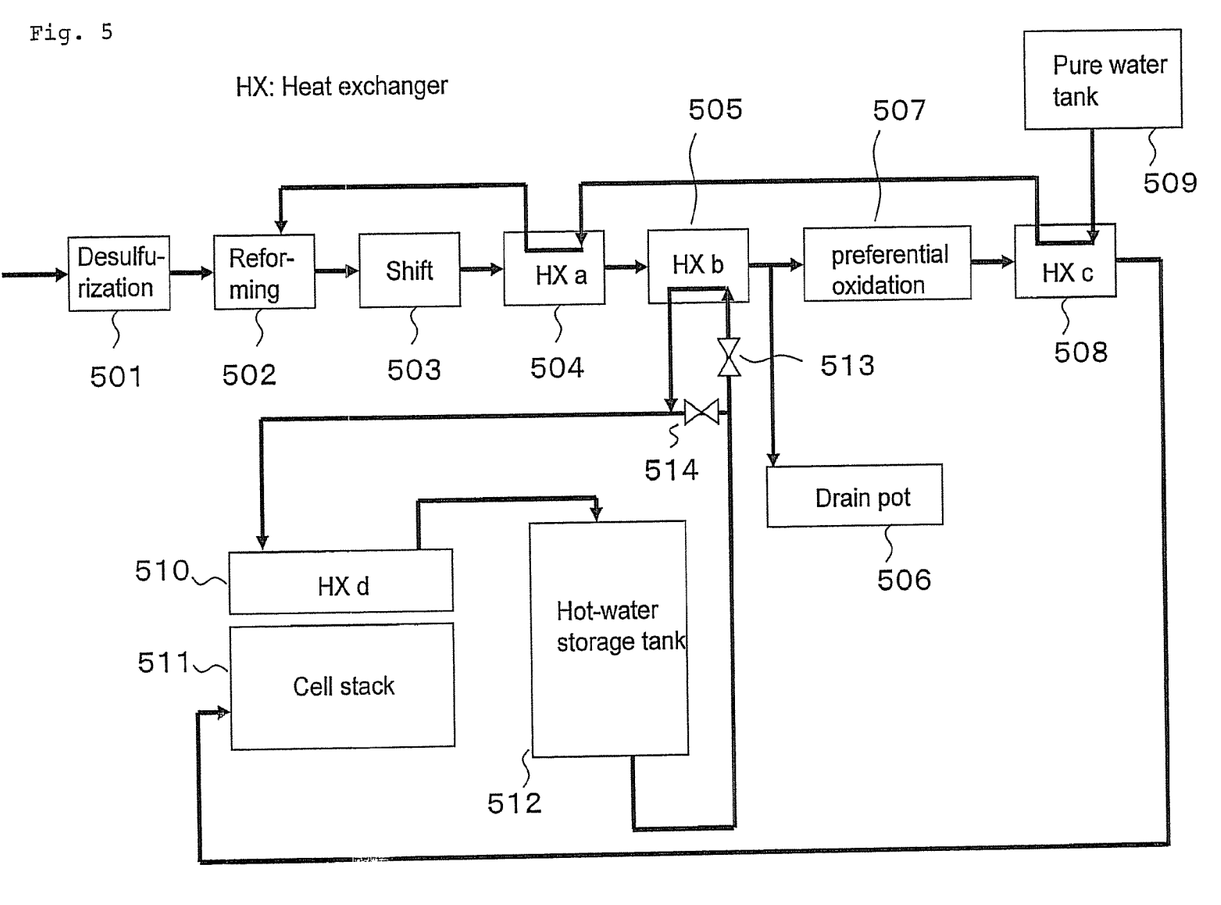
FIG. 5 is a flow diagram illustrating the outline of another embodiment of the fuel cell system of the present invention.

An example of the fuel cell system having a hot-water storage tank will be described using FIG. 5. The fuel cell system shown in FIG. 5 includes a hydrogen production apparatus provided with a desulfurizer 501, a reformer 502, a shift reactor 503, coolers for cooling a gas obtained from the shift reactor (heat exchanger a 504 and heat exchanger b 505) and a preferential oxidation reactor 507 integrated with heating means for heating the gas cooled by the cooler. Furthermore, this hydrogen production apparatus is provided with a pure water tank 509 that contains pure water as process water for reforming and a heat exchanger c 508 that performs heat exchange between the gas obtained from the preferential oxidation reactor and the process water for reforming supplied from the pure water tank, and a drain pot 506 is connected to a line between the heat exchanger b 505 and the preferential oxidation reactor 507.

Furthermore, this fuel cell system is provided with a fuel cell (cell stack) 511 for generating electric power using hydrogen obtained from the hydrogen production apparatus as fuel, a heat exchanger d 510 and a hot-water storage tank 512.

Process water for reforming is used as a cooling medium of the heat exchanger a. That is, water of the pure water tank 509 (water that has passed through the heat exchanger c) is directed to the heat exchanger a 504 and used as a cooling medium, and the water is further supplied to the reformer 502 and used as process water for reforming.

Hydrogen is produced by causing a reforming reaction to take place between the fuel and water on a reforming catalyst. In order to prevent the temperature of the reforming catalyst from dropping, the process water for reforming needs to be completely vaporized and have a high temperature. In the conventional method, an additional vaporizer is required for heating process water for reforming and heating using a burner or heating using a heater is required for heating the vaporizer. Therefore, fuel consumption in the burner was large and reforming efficiency was low. However, by using the process water for reforming as the cooling water in the heat exchanger a 504, the process water for reforming heated by heat exchange in the heat exchanger a 504 is introduced into the reformer 502, and therefore water can be quickly converted to steam without additionally providing a vaporizer. Therefore, less heating is required in the burner compared with the conventional art and there is no need to use a heater for the vaporizer of process water for reforming, and therefore this fuel cell system is extremely efficient.

Since the amount of process water for reforming is small, the temperature of the gas obtained from the shift reactor may not be sufficiently reduced, and in such a case, the heat exchanger b 505 is preferably used. In this fuel cell system, hot water obtained by recovering waste heat of the cell stack 511 is supplied to the stratified storage tank 512 that stores hot water in such a way as to form temperature stratification, waste heat is recovered by the heat-recovery water for the hot-water storage tank withdrawn from the low temperature part of the stratified storage tank 512, and the water is then returned to the high temperature part of the stratified storage tank 512. This waste heat recovery is mainly comprised of recovery of waste heat of the cell stack 511 by the heat exchanger d 510, but it is preferable to supply low temperature water, prior to waste heat recovery in the heat exchanger d 510, to the heat exchanger b 505. When the temperature of the preferential oxidation reactor inlet gas is reduced by the heat exchange at the heat exchanger b 505, and this affects the reaction, a changeover valve (flow rate control valves 513 and 514) may be used so as to make controllable the amount of cooling water (heat-recovery water for the hot-water storage tank) to be supplied to the heat exchanger b505. In this case, in order to keep the reforming efficiency high, for the purpose of giving priority to heating the process water for reforming, it is preferable to first use process water for reforming as the cooling water in the heat exchanger a 504 and then to cool the gas using the heat-recovery water for the hot-water storage tank as the cooling water in the heat exchanger b 505.

When a device (e.g., solenoid valve) whose heat-resistant temperature is lower than the temperature of the gas obtained from the preferential oxidation reactor 507 is used downstream of the preferential oxidation reactor 507, it is preferable to use the heat exchanger 508 to cool the preferential oxidation reactor outlet gas. As the cooling medium in the heat exchanger 508, the aforementioned process water for reforming and/or water of the hot-water storage tank for heat recovery may be used (process water for reforming is used in FIG. 5).

The hydrogen producing method according to the present invention includes a reforming step of obtaining a hydrogen-containing gas from a raw material for hydrogen production by utilizing a reforming reaction; a shift reaction step of reducing the concentration of carbon monoxide in the gas obtained from the reforming step by a shift reaction; a cooling step of cooling the gas obtained from the shift reaction step; a heating step of heating the gas cooled in the cooling step; and a preferential oxidation reaction step of reducing the concentration of carbon monoxide in the gas heated in the heating step using a preferential oxidation catalyst bed packed with a catalyst capable of promoting a preferential oxidation reaction which preferentially oxidizes carbon monoxide. In the heating step, the gas cooled in the cooling step is heated by heat exchange using heat generation in the preferential oxidation reaction.

The hydrogen producing method of the present invention can be implemented using such a hydrogen production apparatus as aforementioned.

In the cooling step, the gas obtained from the shift reaction step is preferably cooled to 0° C. or above and 120° C. or below. This gas temperature is preferably cooled down to 0° C. or above from the standpoint of allowing a combustion reaction in the preferential oxidation reactor to continue and is preferably cooled down to 120° C. or below from the standpoint of maintaining selectivity of CO oxidation in the preferential oxidation reactor and preventing any side reaction such as methanation reaction.

The temperature of the preferential oxidation catalyst bed is preferably from 80° C. to 250° C., and more preferably from 100° C. to 200° C. Regarding this temperature, from the standpoint of allowing a combustion reaction to continue, the maximum temperature of the catalyst bed where a combustion reaction takes place is preferably 80° C. or above and more preferably 100° C. or above. Furthermore, from the standpoint of maintaining selectivity of oxidation of CO and preventing runaway of methanation reaction, the maximum temperature of the catalyst bed is preferably 250° C. or below and more preferably 200° C. or below. When the temperature distribution of the preferential oxidation catalyst bed is taken into consideration, the maximum temperature of the catalyst bed preferably falls within the above-described range.

In order to control the temperature of the preferential oxidation catalyst bed so as to fall within the above-described temperature range, a method of adjusting the temperature of the gas that enters the catalyst bed or a method of directly cooling the catalyst bed with water or cooling it with air using a fan or the like is used. Or, a method combining those methods is adopted. When the preferential oxidation catalyst bed is directly cooled, there are problems such that the temperature of the catalyst bed becomes excessively low and deterioration of the catalyst becomes faster in the case of water-cooling, and there are problems of a cost increase involved in the installation of a fan and loss in power consumption in the case where the preferential oxidation catalyst bed is cooled with air using a fan or the like.

From the standpoint of preferentially removing a trace quantity of CO in the coexistence of a large quantity of hydrogen in the reforming gas, the preferential oxidation catalyst preferably contains at least one metal selected from the group consisting of Ru, Pt, Au, Ni, Co, Rh, Pd, Ir, Ag and Re.

The preferential oxidation catalyst preferably contains at least one oxide selected from ceria, zirconia, titania, alumina, silica and zinc oxide from the standpoint that the oxide has a large surface area, can be industrially acquired in large quantity and is inexpensive.

[Hydrogen Production Apparatus]

A hydrogen production apparatus is an apparatus which produces a gas containing hydrogen from a raw material for hydrogen production. The product gas which is obtained by the hydrogen production apparatus is utilized, for example, by being supplied to the anode chamber of a fuel cell. Further, it is possible to store the product gas as necessary and to utilize it for supplying it to an automobile or the like at a hydrogen station.

In the present invention, the hydrogen production apparatus is equipped with a reformer, for producing a hydrogen-containing gas by reforming the raw material for hydrogen production by a reforming reaction. The hydrogen production apparatus is also equipped with a shift reactor, in the downstream of the reformer for reducing the concentration of carbon monoxide, and equipped with a preferential oxidation reactor, in the downstream of the shift reactor for further reducing the concentration of carbon monoxide. In addition, the hydrogen production apparatus may be equipped with a desulfurizer for reducing the concentration of sulfur content in the raw material for hydrogen production in the upstream of the reformer, as necessary.

[Reformer]

In the reformer, water (steam) and/or oxygen is reacted with the raw material for hydrogen production to produce a reformed gas which contains hydrogen. The raw material for hydrogen production is decomposed into mainly hydrogen and carbon monoxide by this apparatus. Further, usually, carbon dioxide and methane are also contained in the decomposed gas. Examples of the reforming reaction include steam-reforming reaction, autothermal reforming reaction, and partial oxidation reaction.

In the steam-reforming reaction, steam and the raw material for hydrogen production are reacted. Since this reaction absorbs a large amount of heat, usually external heating is required. Generally, the reaction is carried out in the presence of a metal catalyst, with typical examples thereof including VIII group metals such as nickel, cobalt, iron, ruthenium, rhodium, iridium, platinum. The reaction may be carried out at a temperature ranging from 450° C. to 900° C., preferably from 500° C. to 850° C., and more preferably from 550° C. to 800° C. The amount of steam introduced into the reaction system is defined by the ratio of the number of moles of water molecules to the number of moles of carbon atoms included in the raw material for hydrogen production (steam/carbon ratio). The value of this ratio is preferably from 0.5 to 10, more preferably from 1 to 7, and even more preferably from 2 to 5. If the raw material for hydrogen production is a liquid, the space velocity (LHSV) can be expressed as A/B, wherein A (L/h) is the velocity of the raw material for hydrogen production in a liquid state, and B (L) is the catalyst bed volume. This value is preferably set in the range of from 0.05 to 20 $h^{-1}$, more preferably from 0.1 to 10 $h^{-1}$, and even more preferably from 0.2 to 5 $h^{-1}$.

An autothermal reforming reaction is a reforming method in which reaction heats are balanced by oxidizing a part of the raw material for hydrogen production while allowing a steam-reforming reaction to proceed with the heat generated by the oxidation reaction. Since the start-up time is relatively short and the control is relatively easy, recently the autothermal reforming reaction has gained attention as a hydrogen production method for fuel cells. In this case as well, generally, the reaction is carried out in the presence of a metal catalyst, with typical examples thereof including VIII group metals such as nickel, cobalt, iron, ruthenium, rhodium, iridium, platinum. With respect to the amount of steam introduced into the reaction system, the steam/carbon ratio is preferably from 0.3 to 10, more preferably from 0.5 to 5, and even more preferably from 1 to 3.

In autothermal reforming, oxygen is added to the raw material in addition to steam. Although pure oxygen may be used for the oxygen source, in many cases air is used. Generally, the oxygen is added at such amount that can generate an amount of heat capable of balancing the endothermic reaction resulting from the steam-reforming reaction. However, the amount to be added can be determined, as appropriate, in relation to heat loss and external heating which may be provided as necessary. With respect to the amount of oxygen, the ratio of the number of moles of oxygen molecules to the number of moles of carbon atoms included in the raw material for hydrogen production (oxygen/carbon ratio) is preferably from 0.05 to 1, more preferably from 0.1 to 0.75, and even more preferably from 0.2 to 0.6. The reaction temperature for the autothermal reforming reaction is, in the same manner as for a steam-reforming reaction, set in the range of from 450° C. to 900° C., preferably from 500° C. to 850° C., and more preferably from 550° C. to 800° C. If the raw material for hydrogen production is a liquid, the space velocity (LHSV) may be selected within the range of preferably from 0.1 to $30^{-1}$, more preferably from 0.5 to $20^{-1}$, and even more preferably from 1 to $10^{-1}$.

A partial oxidation reaction is a method in which the reforming reaction proceeds with oxidizing the raw material for hydrogen production. Since the start-up time is relatively short and compact design of the apparatus is possible, the partial oxidation reaction is gaining attention as a hydrogen production method. While a catalyst may or may not be used, if a catalyst is used, the reaction is generally carried out in the presence of a metal catalyst, with typical examples thereof including VIII group metals such as nickel, cobalt, iron, ruthenium, rhodium, iridium and platinum, or a perovskite or a spinel type oxide catalyst. To suppress the generation of soot, steam can be introduced to the reaction system. With respect to the amount of steam, the steam/carbon ratio is preferably from 0.1 to 5, more preferably from 0.1 to 3, and even more preferably from 1 to 2.

In partial oxidation reforming, oxygen is added to the raw material. Although pure oxygen may be used for the oxygen source, in many cases air is used. To secure a temperature for making the reaction proceed, the amount to be added is determined, as appropriate, in relation to heat loss and the like. With respect to the amount of oxygen, the ratio of the number of moles of oxygen molecules to the number of moles of carbon atoms included in the raw material for hydrogen production (oxygen/carbon ratio) is preferably from 0.1 to 3, and more preferably from 0.2 to 0.7. The reaction temperature of the partial oxidation reaction may be, in the case of not using a catalyst, set in the range of from 1,000 to 1,300° C. In the case of using a catalyst, the reaction temperature may be, in the same manner as for a steam-reforming reaction, set in the range of from 450° C. to 900° C., preferably from 500° C. to 850° C., and more preferably from 550° C. to 800° C. If the raw material for hydrogen production is a liquid, the space velocity (LHSV) is preferably selected within the range of from 0.1 to $30^{-1}$.

In the present invention, a known reformer which can carry out the above-described reforming reaction can be utilized as the reformer.

[Raw Material for Hydrogen Production]

As the raw material for hydrogen production, a substance from which a reformed gas containing hydrogen can be obtained by the above-described reforming reaction may be used. Examples thereof include compounds having carbon and hydrogen in the molecule, such as hydrocarbons, alcohols, and ethers. Preferred examples thereof which can be acquired at low cost for industrial or consumer use include methanol, ethanol, dimethyl ether, city gas, LPG (liquefied petroleum gas), gasoline, kerosene and the like. Among these, kerosene is preferred, as it can be easily acquired both industrially and domestically, and it is easily handled.

[Shift Reactor]

In addition to hydrogen, the gas generated by the reformer contains, for example, carbon monoxide, carbon dioxide, methane, steam. Further, nitrogen is also contained when air is used as the oxygen source in autothermal reforming and partial oxidation reforming. The shift reactor carries out a shift reaction in which carbon monoxide, contained in the reformed gas, is reacted with water and converted into hydrogen and carbon dioxide. Generally, the reaction proceeds in the presence of a catalyst. Using a catalyst containing a mixed oxide of Fe—Cr, a mixed oxide of Zn—Cu, or a noble metal such as platinum, ruthenium and iridium, the carbon monoxide content (dry base mole %) is decreased to preferably 2% or less, more preferably 1% or less, and still more preferably 0.5% or less. The shift reaction may be carried out in two steps. In such a case, a high-temperature shift reactor and a low-temperature shift reactor are used.

Since the above-described shift reaction is an exothermic reaction, low-temperature operating conditions are preferable according to the equilibrium theory. However in practice, depending on the temperature at which the activity of the used catalyst is exhibited, a certain level of temperature is maintained. Specifically, when carrying out the shift reaction in one step, usually the temperature is in the range of from 100 to 450° C., preferably from 120 to 400° C., and more preferably from 150 to 350° C. If the temperature is lower than 100° C., this case is disadvantageous in that the activity of the catalyst is hard to be exhibited due to CO adsorption of the catalyst itself and there is a tendency for CO conversion not to be well carried out, and if the temperature is greater than 450° C., CO concentration increases according to the equilibrium theory and this case is also disadvantageous in that there is a tendency for CO conversion not to be well carried out.

[Preferential Oxidation Reactor]

To further reduce the carbon monoxide concentration in the shift reactor outlet gas, a preferential oxidation reactor is provided. A preferential oxidation catalyst bed packed with a preferential oxidation catalyst for preferentially oxidizing the carbon monoxide may be used in the preferential oxidation reactor, and the shift reactor outlet gas may be treated by preferential oxidation reaction. A preferential oxidation reactor provided with a preferential oxidation catalyst bed in a vessel may be used for this purpose.

In the preferential oxidation reaction, the carbon monoxide concentration is preferably reduced to 10 ppm or less (dry-base mole basis) by adding, based on the number of moles of the remaining carbon monoxide, preferably from 0.5 to 10 times, more preferably from 0.7 to 5 times, and even more preferably from 1 to 3 times moles of oxygen to preferentially convert the carbon monoxide into carbon dioxide. In such a case, the carbon monoxide concentration may be reduced by reacting coexisting hydrogen with carbon monoxide to form methane simultaneously with the oxidation of the carbon monoxide. The preferential oxidation reaction may be carried out in two steps. If the preferential oxidation catalyst contains Ru, the Ru content may be, for example, 0.02 mass % or more and less than 1 mass %. The Ru content is preferably 0.05 mass % or more and 0.75 mass % or less, and more preferably 0.1 mass % or more and 0.5 mass % or less.

As the oxygen source, air may be supplied to the preferential oxidation reactor.

[Desulfurizer]

It is desirable to reduce the concentration of sulfur in the raw material for hydrogen production as much as possible, since sulfur has an effect of deactivating the reforming catalyst. Preferably, the concentration is 0.1 ppm by mass or less, and more preferably 50 ppb by mass or less. The raw material for hydrogen production may be desulfurized beforehand as necessary. The sulfur concentration in the raw material to be supplied to the desulfurization step is not especially limited, and a raw material may be used as long as its sulfur concentration can be converted into the above-described concentration in the desulfurization step.

An example of the desulfurization method includes, but is not especially limited to, carrying out hydrodesulfurization in the presence of a suitable catalyst and hydrogen, then absorbing generated hydrogen sulfide on zinc oxide or the like. Examples of the catalyst which can be used in this case include catalysts having a component of nickel-molybdenum, cobalt-molybdenum or the like. On the other hand, a method in which the sulfur component is adsorbed in the presence of a suitable adsorbent, and hydrogen as necessary, may also be employed. Examples of the adsorbent which may be used in such a case include adsorbents having a main component of copper-zinc or of nickel-zinc, as disclosed in Japanese Patent Nos. 2654515 and 2688749.

[Composition of the Hydrogen-Containing Gas]

The composition (dry base mole %) of the gas which has undergone a reforming reaction is, if the steam-reforming reaction is used for reforming, usually, for example, from 63 to 73% hydrogen, from 0.1 to 5% methane, from 5 to 20% carbon dioxide, and from 5 to 20% carbon monoxide. On the other hand, if the autothermal reforming reaction is used, the composition (dry base mole %) is usually, for example, from 23 to 37% hydrogen, from 0.1 to 5% methane, from 5 to 25% carbon dioxide, from 5 to 25% carbon monoxide, and from 30 to 60% nitrogen. If the partial oxidation reaction is used, the composition (dry base mole %) is usually, for example, from 15 to 35% hydrogen, from 0.1 to 5% methane, from 10 to 30% carbon monoxide, from 10 to 40% carbon dioxide, and from 30 to 60% nitrogen.

The composition (dry base mole % or mole ppm) of the gas which has undergone the reforming reaction and the shift reaction is, if the steam-reforming reaction is used for reforming, usually, for example, from 65 to 75% hydrogen, from 0.1 to 5% methane, from 20 to 30% carbon dioxide, and from 1,000 to 10,000 ppm carbon monoxide. On the other hand, if the autothermal reforming reaction is used, the composition (dry base mole % or mole ppm) is usually, for example, from 25 to 40% hydrogen, from 0.1 to 5% methane, from 20 to 40% carbon dioxide, from 1,000 to 10,000 ppm carbon monoxide, and from 30 to 54% nitrogen. If the partial oxidation reaction is used, the composition (dry base mole %) is usually, for example, from 20 to 40% hydrogen, from 0.1 to 5% methane, from 1,000 to 10,000 ppm carbon monoxide, from 20 to 45% carbon dioxide, and from 30 to 55% nitrogen.

The composition (dry base mole %) of the gas which has undergone the reforming reaction, the shift reaction, and the preferential oxidation reaction is, if the steam-reforming reaction is used for reforming, usually, for example, from 65 to 75% hydrogen, from 0.1 to 5% methane, from 20 to 30% carbon dioxide, and from 1 to 10% nitrogen. On the other hand, if the autothermal reforming reaction is used, the composition (dry base mole %) is usually, for example, from 25 to 40% hydrogen, from 0.1 to 5% methane, from 20 to 40% carbon dioxide, and from 30 to 54% nitrogen. If the partial oxidation reforming reaction is used, the composition (dry base mole %) is usually, for example, from 20 to 40% hydrogen, from 0.1 to 5% methane, from 20 to 45% carbon dioxide, and from 30 to 55% nitrogen.

[Fuel Cell]

With respect to the fuel cell, a type of a fuel cell in which hydrogen is the reactant of the electrode reaction at the fuel electrode may be appropriately employed. Examples of fuel cells which can be used include a polymer electrolyte type, a phosphoric acid type, a molten carbonate type, and a solid oxide type. Hereinafter, the structure of a polymer electrolyte fuel cell will be described.

The fuel cell electrodes include an anode (fuel electrode), a cathode (air electrode), and a solid polymer electrolyte which is sandwiched between these. A hydrogen-containing gas produced by the above-described hydrogen production apparatus is introduced on the anode side, and an oxygen-containing gas such as air is introduced on the cathode side. Each of these gases may be introduced after being subjected to a suitable humidification treatment as necessary.

At the anode, a reaction proceeds in which the hydrogen gas is turned into protons and electrons are released, and at the cathode, a reaction proceeds in which the oxygen gas receives protons and electrons to form water. To promote these reactions, respectively, at the anode, a catalyst such as platinum black, Pt catalyst supported on activated carbon, or Pt—Ru alloy catalyst is used, and at the cathode, a catalyst such as platinum black or Pt catalyst supported on activated carbon is used. Usually, each of the catalysts of the anode and the cathode is formed into a porous catalyst layer, along with tetrafluoroethylene, a polymer electrolyte membrane material, activated carbon and the like as necessary.

As the solid polymer electrolyte, typically a polymer electrolyte membrane known under a product name such as Nafion (manufactured by DuPont), Gore (manufactured by W. L. Gore & Associates, Inc.), Flemion (manufactured by Asahi Glass Co., Ltd.), and Aciplex (manufactured by Asahi Kasei Corporation), is used. The above-described porous catalyst layer is laminated on either side of such membrane to form a membrane electrode assembly (MEA). Further, the fuel cell is assembled by sandwiching the MEA with separators which are composed of a metal material, graphite, a carbon composite or the like, and which have a gas supplying function, a current collection function, and a water removing function that is especially important at the cathode. The electric load is electrically connected with the anode and the cathode.

[Other Devices]

In addition to the above-described devices, well-known components of a hydrogen production apparatus which utilizes a reformer, and well-known components of a fuel cell system may be appropriately provided as necessary. Specific examples include: a steam generator for generating steam to humidify the gases supplied to the fuel cell; a cooling system for cooling various devices such as the fuel cell and the like;

pressurizing means such as a pump, a compressor and a blower for pressurizing various fluids; flow control means and flow passage shut off/switching means, such as a valve, for controlling the flow rate of a fluid or shutting off/switching the flow of a fluid; a heat exchanger for heat exchange/heat recovery; a vaporizer for vaporizing a liquid; a condenser for condensing a gas; heating/keeping-warm means for externally heating various devices with steam or the like; storage means of various fluids; an air or electrical system for instrumentation; a signal system for control; a control apparatus; an electrical system for output and required power or the like.

EXAMPLES

Hereinafter, the present invention will be described in detail using examples. However, the present invention is not limited to those examples.

Example 1

A test simulating a case where there is temperature fluctuation of a cooling medium was conducted using a preferential oxidation reactor integrated with a heating means having the structure shown in FIG. 3. That is, while varying the temperature of the gas to be supplied to the preferential oxidation reactor, the temperature of the preferential oxidation catalyst bed was measured.

To be more specific, using the preferential oxidation reactor with the specification shown below, a gas shown below was supplied to the inner tube thereof and preferential oxidation reaction was performed in the preferential oxidation catalyst bed provided for the annular section. The surroundings of the preferential oxidation reactor were covered with a heat insulator, and the preferential oxidation reactor was not heated from outside.

<Preferential Oxidation Reactor>
 Inner diameter of inner tube: 6.5 mm
 Outside diameter of inner tube: 9.52 mm
 Inner diameter of outer tube: 57 mm
 Preferential oxidation catalyst (type): $Ru/Al_2O_3$
 Height of preferential oxidation catalyst bed: 54 mm
 Bulk volume of preferential oxidation catalyst: 0.20 L
<Condition of Gas to be Supplied to Preferential Oxidation Reactor>
 Compositional flow rate
 $H_2$: 15 NL/min
 $CO_2$: 4.9 NL/min
 CO: 0.100 NL/min (5000 ppm)
 Air: 0.65, 0.75, 0.86 NL/min
 $H_2O$: 12.2 volume % (when gas temperature is equal to or above 50° C.), 0 volume % (when gas temperature is less than 50° C.)
 "NL/min" represents L/min corresponding to 0° C., 1 atm (0.101 MPa).

The temperature of the feed gas to the preferential oxidation reactor (temperature of the preferential oxidation reactor inlet gas) was varied, and the temperature of the preferential oxidation catalyst bed and the concentration of CO in the preferential oxidation reactor outlet gas in the cases of the respective temperatures of the feed gas were measured.

Figure 6:
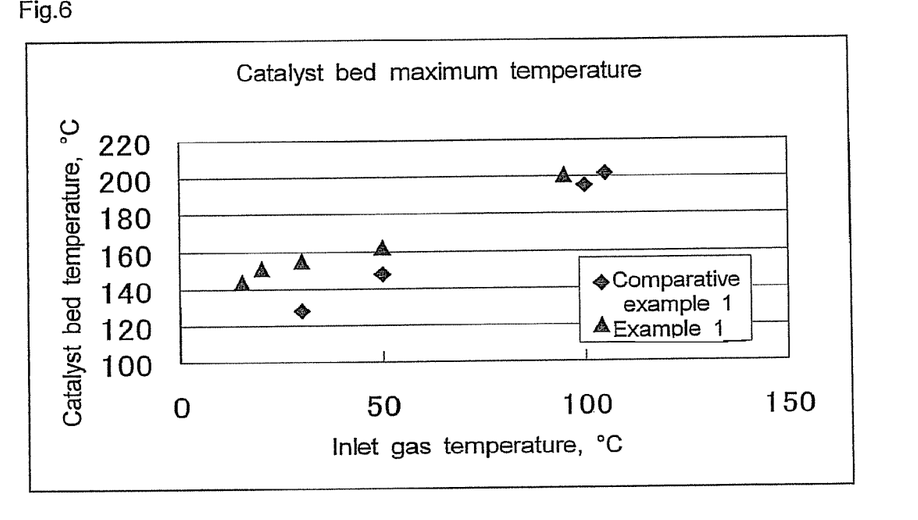
FIG. 6 is a graph illustrating results of an example and a comparative example (relationship between an inlet gas temperature and a catalyst bed maximum temperature)
Figure 7:
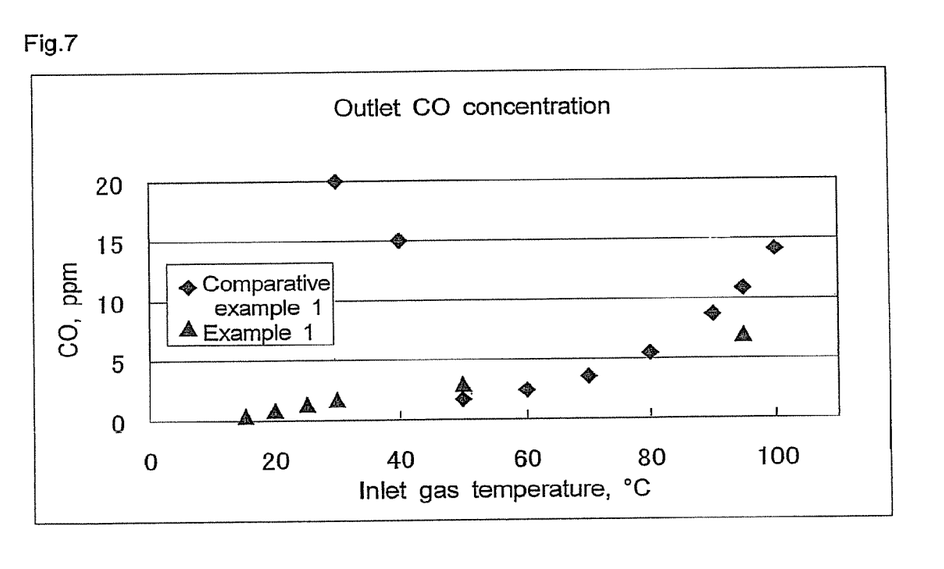
FIG. 7 is a graph illustrating results of the example and the comparative example (relationship between an inlet gas temperature and concentration of outlet carbon monoxide)

FIG. 6 is a graph illustrating a relationship between the gas temperature (° C.) at the preferential oxidation reactor inlet and maximum temperature (° C.) of the preferential oxidation catalyst bed. The inlet gas temperature is the temperature of the gas supplied to the inner tube 302 in Example 1 and the temperature of the gas supplied to the cylindrical vessel 403 in comparative example 1. FIG. 7 is a graph illustrating a relationship between the temperature (° C.) of the preferential oxidation reactor inlet gas and concentration of CO (dry mole ppm) in the preferential oxidation reactor outlet gas. When the preferential oxidation reactor outlet gas is supplied to a solid polymer fuel cell, the concentration of CO in the preferential oxidation reactor outlet gas is preferably 10 dry moles ppm or below.

Comparative Example 1

Figure 4:
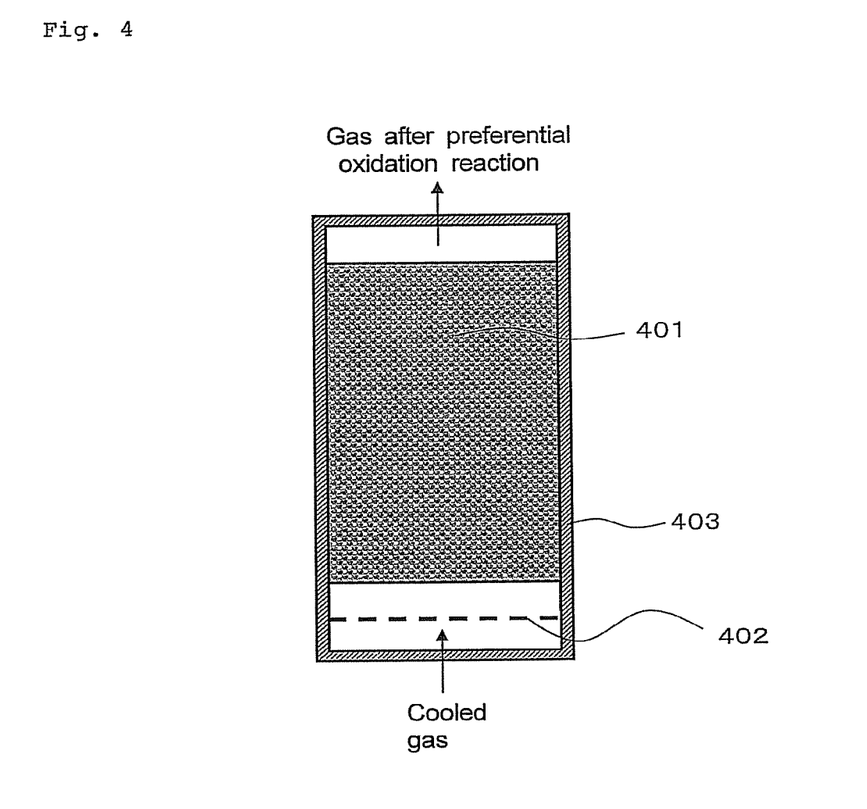
FIG. 4 is a schematic cross-sectional view of a preferential oxidation reactor used in a comparative example.

The preferential oxidation reactor having a structure shown in FIG. 4 was used. Details of this reactor are described below. A preferential oxidation catalyst bed 401 is housed in a cylindrical vessel 403. A distribution plate 402 for distributing a gas is provided on the upstream side thereof.

Figure 8:
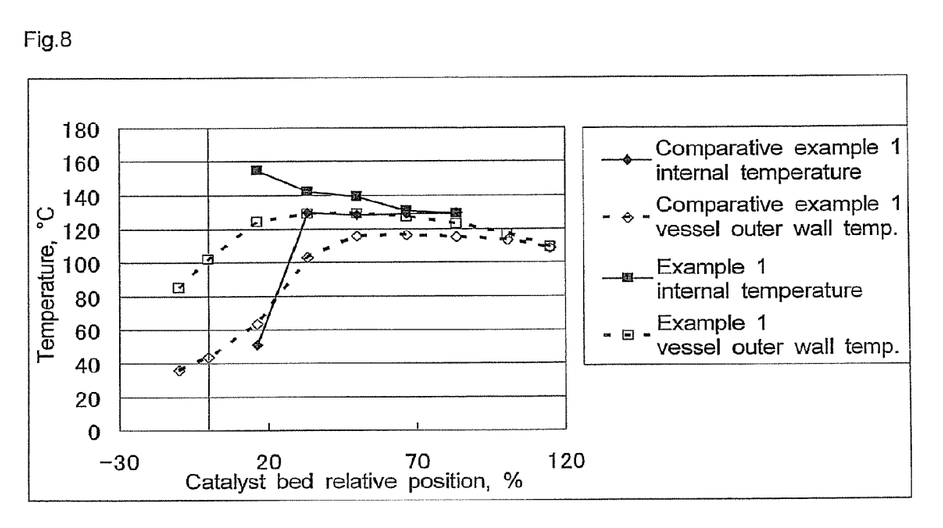
FIG. 8 is a graph illustrating results of the example and the comparative example (a temperature distribution in the preferential oxidation catalyst bed and a temperature distribution on the outer wall of a vessel when the inlet gas temperature is 30° C.).

A test similar to that in Example 1 except for the above was conducted. The measurement results are shown in FIGS. 6 and 7.
<Preferential Oxidation Reactor>
 Inner diameter of reactor: 57 mm
 Preferential oxidation catalyst (type): same as Example 1
 Height of preferential oxidation catalyst bed: 85 mm
 Bulk volume of preferential oxidation catalyst: 0.20 L According to the present invention, the gas cooled by the cooler may exchange heat with the preferential oxidation catalyst bed and preferential oxidation reactor outlet gas. As an example, FIG. 8 illustrates a temperature distribution of the preferential oxidation catalyst bed (displayed as "internal temperature" in FIG. 8) and a distribution of the vessel outer wall temperature (temperature of the outer tube 304 in Example 1 and temperature of the cylindrical vessel 403 in comparative example 1) when the inlet gas temperature is 30° C. The "catalyst bed relative position" represents the position of a temperature measuring point (thermocouple) where it is 0 at the catalyst bed inlet and it is 100 at the catalyst bed outlet. In comparative example 1, when the temperature of the vessel inlet is low, the temperature of the catalyst bed inlet decreases and it is impossible to maintain combustion reaction and it is thereby impossible to reduce CO to 10 ppm or below. On the other hand, according to Example 1, even when the temperature of the vessel inlet gas is low, it was possible for the gas to perform heat exchange with the preferential oxidation catalyst bed and preferential oxidation reactor outlet gas before entering the catalyst bed, and it was thereby possible to increase the gas temperature and reduce the CO concentration to 10 ppm or below.

In Example 1, the adaptivity to low temperature was considerably improved and no decrease of the catalyst bed temperature was observed even under a condition of inlet gas temperature of 15° C. The temperature of the gas when substantially entering the catalyst bed was 70° C. (measured using a thermocouple provided at a portion 306 in the vessel). On the other hand, when the inlet gas temperature increases, the inlet gas temperature is cooled by the catalyst bed, and therefore, the situation is the same as in comparative example 1, or the available temperature range on the high temperature side is widened.

Industrial Applicability

The hydrogen production apparatus according to the present invention may be utilized for the production of a hydrogen-containing gas to serve as a fuel for a fuel cell, or may be utilized at a hydrogen station and the like for supplying a hydrogen-containing gas to an automobile.

The fuel cell system according to the present invention may be used in a power generation apparatus for moving vehicles such as an automobile, stationary power generation systems, cogeneration systems and the like.

The invention claimed is:

1. A hydrogen production apparatus comprising:
   a reformer configured to obtain a hydrogen-containing gas from a raw material for hydrogen production by utilizing a reforming reaction;
   a shift reactor configured to reduce the concentration of carbon monoxide in the gas obtained from the reformer by a shift reaction;
   a cooler configured to cool the gas obtained from the shift reactor;
   a heat exchange structure configured to heat the gas cooled by the cooler; and
   a preferential oxidation reactor comprising a preferential oxidation catalyst bed packed with a catalyst capable of promoting a preferential oxidation reaction which preferentially oxidizes carbon monoxide, the preferential oxidation reactor being configured to reduce the concentration of carbon monoxide in the gas heated by the heat exchange structure,
   wherein the cooler is provided downstream of the shift reactor, and the heat exchange structure and the preferential oxidation reactor are provided separately from and downstream of the cooler; and
   wherein the heat exchange structure and the preferential oxidation reactor are configured so that the gas cooled by the cooler is heated upstream of the preferential oxidation catalyst bed with the use of heat generated by the preferential oxidation reaction.

2. The hydrogen production apparatus according to claim 1, wherein the heat exchange structure is a structure capable of exchanging heat between the gas cooled by the cooler and at least one of a gas discharged from the preferential oxidation catalyst bed and the preferential oxidation catalyst bed.

3. The hydrogen production apparatus according to claim 2, comprising a structure in which the preferential oxidation reactor is integrated with the heat exchange structure.

4. The hydrogen production apparatus according to claim 3, wherein the structure in which the preferential oxidation reactor is integrated with the heat exchange structure comprises a double tube structure, and
   the preferential oxidation catalyst bed is housed in the interior of an inner tube of the double tube structure, and an annular section of the double tube structure is made to be a channel for the gas cooled by the cooler.

5. The hydrogen production apparatus according to claim 3, wherein
   the structure in which the preferential oxidation reactor is integrated with the heat exchange structure comprises a double tube structure,
   the interior of the inner tube of the double tube structure is made to be a channel for the gas cooled by the cooler, and the preferential oxidation catalyst bed is housed in a region of a part of the annular section of the double tube structure, and
   a region of another part of the annular section located downstream of the former region in a flow direction of the gas that flows through the annular section is made to be a channel for the gas discharged from the preferential oxidation catalyst bed.

6. The hydrogen production apparatus according to claim 1, comprising a condensed water separation means for separating condensed water generated through cooling by the cooler from the gas obtained from the shift reactor.

7. The hydrogen production apparatus according to claim 1, wherein the cooler is a water-cooling cooler.

8. The hydrogen production apparatus according to any claim 7, wherein the cooling medium in the cooler is process water for reforming.

9. A hydrogen producing method, comprising:
   obtaining a hydrogen-containing gas from a raw material for hydrogen production by utilizing a reformer;
   reducing the concentration of carbon monoxide in the hydrogen-containing gas by a shift reactor;
   cooling the gas obtained from the shift reactor by a cooler;
   heating the cooled gas by a heat exchange structure; and
   reducing the concentration of carbon monoxide in the heated gas using a preferential oxidation reactor comprising a preferential oxidation catalyst bed packed with a catalyst capable of promoting a preferential oxidation reaction which preferentially oxidizes carbon monoxide,
   wherein the cooler is provided downstream of the shift reactor, and the heat exchange structure and the preferential oxidation reactor are provided separately from and downstream of the cooler, and
   wherein in the heating the cooled gas, the cooled gas is heated upstream of the preferential oxidation catalyst bed by heat exchange with the use of heat generated by the preferential oxidation reaction.

10. The hydrogen producing method according to claim 9, wherein in the cooling the gas obtained from the shift reaction, the gas obtained from the shift reaction is cooled to 0° C. or above and 120° C. or below.

11. The hydrogen producing method according claim 9, wherein the temperature of the preferential oxidation catalyst bed is made to be 80° C. or above and 250° C. or below.

12. A fuel cell system comprising:
   a hydrogen production apparatus comprising:
   a reformer configured to obtain a hydrogen-containing gas from a raw material for hydrogen production by utilizing a reforming reaction,
   a shift reactor configured to reduce the concentration of carbon monoxide in the gas obtained from the reformer by a shift reaction,
   a cooler configured to cool the gas obtained from the shift reactor,
   a heat exchange structure configured to heat the gas cooled by the cooler, and
   a preferential oxidation reactor comprising a preferential oxidation catalyst bed packed with a catalyst capable of promoting a preferential oxidation reaction which preferentially oxidizes carbon monoxide, the preferential oxidation reactor being configured to reduce the concentration of carbon monoxide in the gas heated by the heat exchange structure,
   wherein the cooler is provided downstream of the shift reactor, and the heat exchange structure and the preferential oxidation reactor are provided separately from and downstream of the cooler; and
   the heat exchange structure and the preferential oxidation reactor are configured so that the gas cooled by the cooler is heated upstream of the preferential oxidation catalyst bed with the use of heat generated by the preferential oxidation reaction; and
   a fuel cell for generating electric power using hydrogen obtained from the hydrogen production apparatus as fuel.

13. The fuel cell system according to claim 12, wherein the cooler is a water-cooling cooler and a cooling medium in the cooler is process water for reforming.

14. The fuel cell system according to claim 12, further comprising a hot-water storage tank, wherein the cooler is a water-cooling cooler, and
a cooling medium in the cooler is heat-recovery water for the hot-water storage tank.

15. The fuel cell system according to claim 12, further comprising a hot-water storage tank, wherein
the cooler is a water-cooling cooler, and
a cooling medium in the cooler is process water for reforming and heat-recovery water for the hot-water storage tank.

16. The hydrogen production apparatus according to claim 1, wherein the cooler is provided separately from the shift reactor, and the heat exchange structure and the preferential oxidation reactor are provided separately from the cooler.

17. The hydrogen producing method according to claim 9, wherein the cooler is provided separately from the shirt reactor, and the heat exchange structure and the preferential oxidation reactor are provided separately from the cooler.

18. The fuel cell system according to claim 12, wherein the cooler is provided separately from the shift reactor, and the heat exchange structure and the preferential oxidation reactor are provided separately from the cooler.

* * * * *